Nov. 29, 1927.
A. A. TROMBLEY
1,651,076
TIRE SPREADER
Filed March 8, 1927
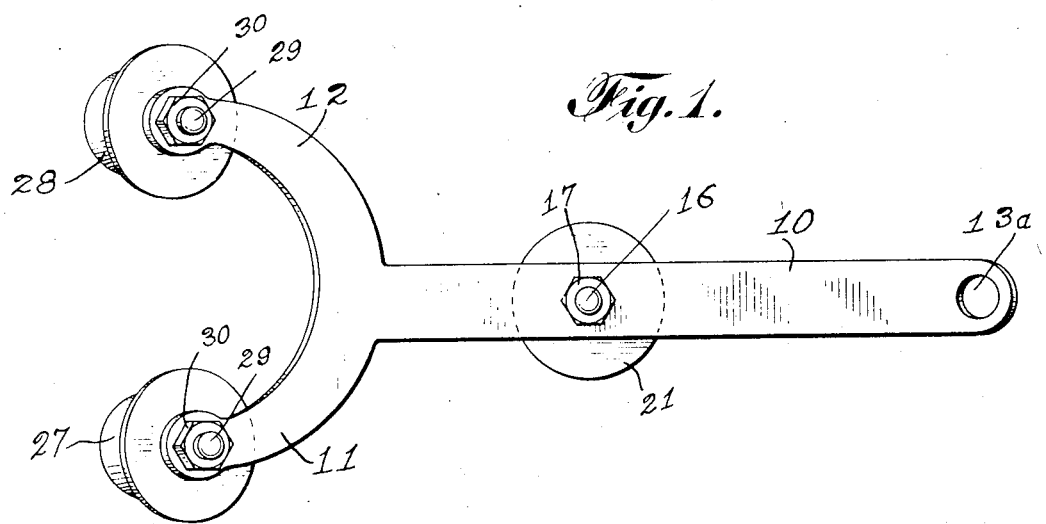
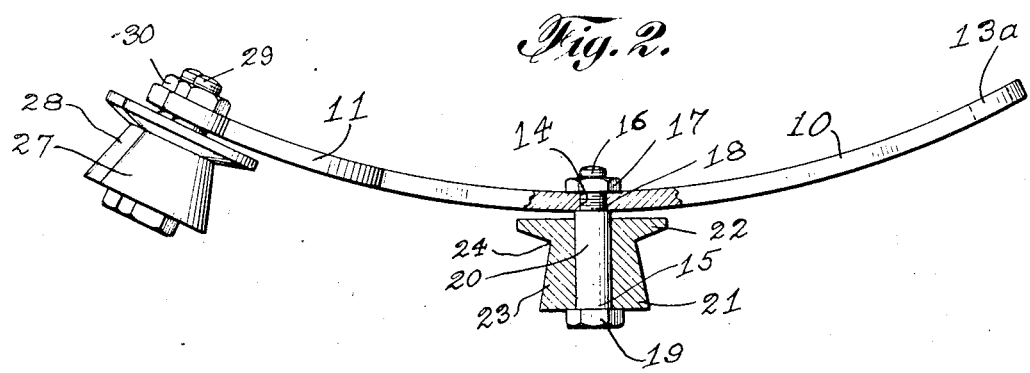
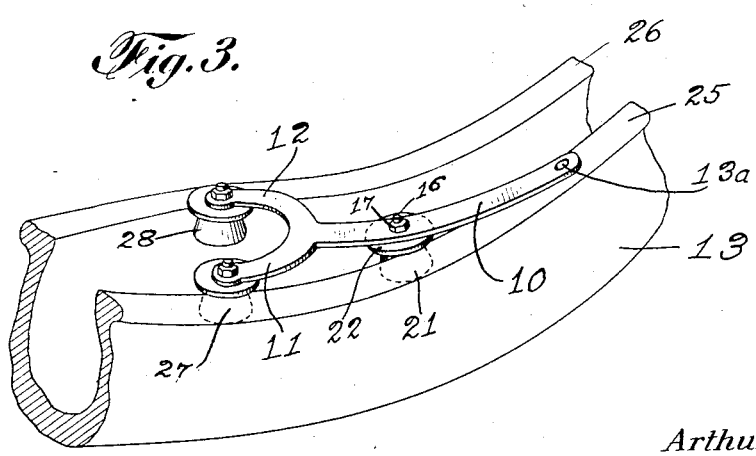
INVENTOR
*Arthur A. Trombley*
BY
*H. G. Manning*
ATTORNEY Patented Nov. 29, 1927.

1,651,076

UNITED STATES PATENT OFFICE.

ARTHUR A. TROMBLEY, OF PLAINVILLE, CONNECTICUT.

TIRE SPREADER.

Application filed March 8, 1927. Serial No. 173,638.

This invention relates to tire spreading tools, and more particularly to a tire spreading tool for use in opening a tire casing in order to permit access to the interior thereof for inspection and repair.

One object of this invention is to provide a tire spreading tool of the above nature having means to permit the tool to be readily and easily moved along a tire casing for inspecting the entire interior circumference thereof.

A further object is to provide a tire spreading tool of the above nature which, when arranged in normal position, will automatically maintain the tire casing in open position.

A further object is to provide a tire spreading tool of the above nature adapted to be manipulated for opening the tire to greater than the normal extent whenever desired.

A further object is to provide a device of the above nature which will be simple in construction, inexpensive to manufacture, easy to manipulate, compact, and very efficient and durable in use.

With these and other objects in view there has been illustrated on the accompanying drawings one form in which the invention may be conveniently embodied in practice.

Fig. 1 represents a plan view of a tire spreading tool embodying the invention.

Fig. 2 is a side view of the same, shown partly in section.

Fig. 3 is a perspective view of a portion of a tire casing with the tire spreading tool in operating position.

Referring now to the drawings in which like reference numerals denote corresponding parts throughout the several views, the tire spreading tool comprises a substantially T-shaped bar, preferably of metal, having an elongated handle 10 and a bifurcated or forked end including a pair of curved arms or prongs 11 and 12 connected with said handle at one end thereof. The handle 10 and the prongs 11 and 12 preferably lie in a uniformly curved surface, the radius of curvature of which is substantially the same as the radius of the tire casing 13.

The handle 10 at the end opposite from the prongs 11 and 12 is provided with a circular aperture 13ª for permitting the tool to be hung up upon a hook or other suitable support when not in use. The handle 10 is provided intermediate its ends with an aperture 14 for receiving a roller-holding bolt 15, said bolt 15 having a reduced threaded extremity 16 upon which is mounted a nut 17. When the nut 17 is tightly screwed down upon the handle 10, it will securely lock the bolt 15 upon said handle, a shoulder 18 of said bolt being adapted to engage with the convex under face of said handle 10.

The bolt 15 has a hexagonal head 19 and a smooth unthreaded section 20 for supporting a spool-shaped roller 21, said roller being somewhat loose on said section 20 and slidable between the tool handle 10 and the bolt head 19. The roller 21 is provided with a relatively flat thin tapered base 22 and a relatively steep tapered annular body portion 23, whereby an annular shoulder 24 is formed between the base 22 and the body portion 23, said shoulder being adapted to engage either of the beads 25 and 26 of the tire casing 13.

The ends of the prongs 11 and 12 are also provided with spool-shaped rollers 27 and 28 similar in all respects to the roller 21 previously described, said rollers 27 and 28 being connected to the ends of said prongs 11 and 12 by bolts 29 and nuts 30 similar to the bolt 15 and nut 17, previously described.

In order to permit the tire casing to be spread apart by varying amounts, the prong 12 is made somewhat longer than the prong 11. It will thus be seen that the roller 21 is further from the roller 28 than from the roller 27, and consequently, the tire casing will be spread open a greater amount when the handle 10 is swung in a clockwise direction than when swung in the reverse direction.

In operation, when it is desired to insert the tool within the tire casing for spreading the same, the operator will first bring the tool up to the casing with the handle 10 at right angles thereto and position the rollers 27 and 28 in alinement with the opening in the casing. The rollers 27 and 28 will then be moved downwardly between the beads 25 and 26, and the handle 10 will next be rotated in a counter-clockwise direction until it is parallel with said beads. At this time the handle 10 may be moved downwardly to bring the roller 21 into engagement with the bead 25. The parts will then be in the position shown in Fig. 3 which is the normal operating position of the tool. With the tool held in this normal position, the handle 10 may be moved along in either direction to open the casing throughout its entire circumference, permitting the operator to locate punctures, etc., and remove nails or other foreign articles.

Whenever the operator desires to open the tire casing still further, the handle 10 may be rotated either forwardly or rearwardly, as viewed in Fig. 3. When rotated forwardly or in a clockwise direction, the tire casing 13 will be spread open a greater amount, corresponding to the distance between the rollers 21 and 28. When the handle is rotated rearwardly or in a counterclockwise direction, the casing 13 will be opened a still greater amount, corresponding to the distance between the rollers 21 and 27.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a tire spreading tool, a body member having a handle, a pair of bead-engaging rollers on said body member for spreading apart the beads of said tire to a certain distance, and a third bead-engaging roller mounted on said handle for co-acting with one of said first-mentioned rollers to permit said bead to be spread apart a still greater distance.

2. In a tire spreader, a body member having three radial arms, each of said arms carrying a bead-engaging roller whereby said tire spreader may be moved about the entire circumference of the tire casing to permit inspection and repair.

3. In a tire spreader, a body member having three radial arms, each of said arms carrying a bead-engaging roller whereby said tire spreader may be moved about the entire circumference of the tire casing to permit inspection and repair, one of said arms having a handle member connected therewith.

4. In a tire spreader, a body member having three radial arms, each of said arms carrying bead-engaging means whereby said tire spreader may be moved about the entire circumference of the tire casing to permit inspection and repair.

5. In a tire spreader, a body member having three radial arms, each of said arms carrying bead-engaging means whereby said tire spreader may be moved about the entire circumference of the tire casing to permit inspection and repair, said body member and arms lying in a curved substantially cylindrical surface.

6. In a tire spreading tool, a handle shank having a bifurcated end provided with a pair of prongs, tire bead-engaging means located on each of said prongs whereby said casing may be spread open for inspection and repair, said handle shank also having intermediate its ends a third bead-engaging means, said third bead-engaging means cooperating with one of said other bead-engaging means for still further spreading open said casing.

7. In a tire spreading tool, a handle member having bead-engaging means intermediate its ends, a pair of curved prongs projecting from one end of said handle member, one of said prongs being longer than the other, and each of said arms carrying bead-engaging means at its extremity whereby said tool may be moved about the casing for inspection and repair.

8. In a tire spreading tool, a handle member having bead-engaging means intermediate its ends, a pair of prongs projecting from one end of said handle member, and each of said prongs carrying bead-engaging means at its extremity whereby said tool may be moved about the casing for inspection and repair.

9. In a tire spreading tool, a handle member having a bead-engaging roller intermediate its ends, a pair of prongs projecting from one end of said handle member, and each of said prongs carrying a bead-engaging roller at its extremity whereby said tool may be moved about the casing for inspection and repair.

10. In a tire spreader, a body member having three radial arms, each of said arms carrying a bead-engaging flanged roller whereby said tire spreader may be moved about the entire circumference of the tire casing to permit inspection and repair with any two of said rollers engaging the beads of said tire.

11. In a tire spreader, a body member having three radial arms, each of said arms carrying a bead-engaging detachable flanged roller whereby said tire spreader may be moved about the entire circumference of the tire casing to permit inspection and repair with two of said rollers engaging the beads of said tire.

In testimony whereof, I have affixed my signature to this specification.

ARTHUR A. TROMBLEY.